United States Patent
Kuraki et al.

(10) Patent No.: US 9,127,331 B2
(45) Date of Patent: Sep. 8, 2015

(54) METHOD FOR PRODUCING OXIDE/HYDROXIDE

(75) Inventors: Jun Kuraki, Izumi (JP); Masaki Maekawa, Izumi (JP); Daisuke Honda, Izumi (JP); Masakazu Enomura, Izumi (JP)

(73) Assignee: M. Technique Co., Ltd., Izumi-shi (JP)

( * ) Notice: Subject to any disclaimer, the term of this patent is extended or adjusted under 35 U.S.C. 154(b) by 18 days.

(21) Appl. No.: 14/112,887

(22) PCT Filed: Apr. 28, 2011

(86) PCT No.: PCT/JP2011/060486
§ 371 (c)(1),
(2), (4) Date: Oct. 18, 2013

(87) PCT Pub. No.: WO2012/147209
PCT Pub. Date: Nov. 1, 2012

(65) Prior Publication Data
US 2014/0037519 A1  Feb. 6, 2014

(51) Int. Cl.
| | | |
|---|---|---|
| C22B 19/00 | (2006.01) |
| C22B 19/34 | (2006.01) |
| C01B 13/32 | (2006.01) |
| C01B 13/34 | (2006.01) |
| C01G 9/02 | (2006.01) |
| C01G 9/03 | (2006.01) |
| B01F 7/00 | (2006.01) |
| B01F 15/02 | (2006.01) |
| B01F 3/08 | (2006.01) |
| B82Y 30/00 | (2011.01) |

(52) U.S. Cl.
CPC .............. *C22B 19/34* (2013.01); *B01F 3/0807* (2013.01); *B01F 7/00775* (2013.01); *B01F 7/00791* (2013.01); *B01F 15/0203* (2013.01); *B01F 15/0243* (2013.01); *B01F 15/0291* (2013.01); *B82Y 30/00* (2013.01); *C01B 13/32* (2013.01); *C01B 13/34* (2013.01); *C01G 9/02* (2013.01); *C01G 9/03* (2013.01); *C01P 2002/01* (2013.01); *C01P 2002/72* (2013.01); *C01P 2002/88* (2013.01); *C01P 2004/04* (2013.01); *C01P 2004/62* (2013.01); *C01P 2004/64* (2013.01)

(58) Field of Classification Search
None
See application file for complete search history.

(56) References Cited

U.S. PATENT DOCUMENTS

| | | |
|---|---|---|
| 2010/0202960 A1 | 8/2010 | Enomura |
| 2010/0243947 A1 | 9/2010 | Enomura |
| 2011/0015054 A1 | 1/2011 | Enomura |
| 2011/0042626 A1 | 2/2011 | Enomura |
| 2013/0166682 A1 | 6/2013 | Kakihara |

FOREIGN PATENT DOCUMENTS

| | | |
|---|---|---|
| CN | 1865150 A | 11/2006 |
| CN | 101808942 A | 8/2010 |
| CN | 101855713 A | 10/2010 |
| CN | 101868316 A | 10/2010 |
| EP | 2193865 A1 | 6/2010 |
| EP | 2610215 A1 | 7/2013 |
| JP | 11-60246 A | 3/1999 |
| JP | 2010-285334 A | 12/2010 |
| WO | WO 2009/008392 A1 | 1/2009 |
| WO | WO 2009/008393 A1 | 1/2009 |
| WO | WO 2009/020188 A1 | 2/2009 |
| WO | WO 2009/035019 A1 | 3/2009 |
| WO | WO 2009041274 A1 * | 4/2009 |

OTHER PUBLICATIONS

Zhai et al., "Effects of ammonia and cetyltrimethylammonium bromide (CTAB) on morphologies of ZnO nano- and micromaterials under solvothermal process," Materials Chemistry and Physics, vol. 112, Issue 3, Dec. 20, 2008, pp. 1024-1028, IIC130077.

* cited by examiner

*Primary Examiner* — Steven Bos
(74) *Attorney, Agent, or Firm* — Birch, Stewart, Kolasch & Birch, LLP

(57) ABSTRACT

Provided is a method for producing an oxide and/or hydroxide wherein the ratio of oxide and hydroxide has been controlled. The method produces an oxide, a hydroxide, or a mixture thereof, and obtains an oxide and/or a hydroxide wherein the ratio of oxide and hydroxide has been controlled by means of changing a specific condition relating to at least one fluid to be processed introduced between processing surfaces (1, 2) when causing the precipitation of the oxide, hydroxide, or mixture thereof by mixing an basic fluid containing at least one type of basic substance and a fluid containing at least one type of metal or metallic substance as the fluids to be processed between the processing surfaces (1, 2) that are provided facing each other, are able to approach to and separate from each other, and of which at least one rotates relative to the other. The specific condition is at least one condition selected from the group consisting of: the speed of introduction of at least one of the fluids to be processed; and the pH of at least one of the fluids to be processed.

7 Claims, 4 Drawing Sheets

(A)

(B)

METHOD FOR PRODUCING OXIDE/HYDROXIDE

TECHNICAL FIELD

The present invention relates to a method for producing oxide/hydroxide.

BACKGROUND ART

In recent years, an oxide, a hydroxide, or a hydroxide as a precursor to an oxide have been wanted in a wide field such as a catalyst, a conductive material, a magnetic material, a secondary electron releasing material, a luminescent material, a heat absorber, an energy storage material, an electrode material, and a coloring material; and in accordance with its object and requirement, any one of an oxide and a hydroxide or both having a controlled ratio of the oxide to the hydroxide have been considered to be necessary. For example, zinc oxide has been widely used as a transparent electrode, a fluorescent material, a drug, and so forth because of its electrical, optical, and chemical characteristics. In considering its intended use and characteristics, zinc oxide is produced in a certain case by preparing zinc hydroxide or a mixture of zinc oxide and zinc hydroxide, which is followed by baking thereof; and in this case, any one of the oxide and the hydroxide or both having a controlled mixing ratio of the oxide to the hydroxide are considered to be necessary.

As to the method for producing an oxide or a hydroxide, methods shown in Patent Document 1 and Patent Document 2 have been known; but it has been difficult to selectively obtain the oxide and the hydroxide by these conventional methods, so that it has been even more difficult to produce the oxide and the hydroxide having a controlled ratio of the oxide to the hydroxide. In addition, in the case that microparticles of an oxide or a hydroxide are produced in a reaction vessel as disclosed in Patent Document 2, reaction conditions tend to be inhomogeneous due to concentration distribution and temperature distribution in the reaction vessel; and thus, not only to control a ratio of the oxide to the hydroxide but also to obtain uniform particle diameter has been difficult.

Meanwhile, a method for producing ceramic microparticles as shown in Patent Document 3 has been provided by the present applicant, but a method to control a ratio of an oxide to a hydroxide has not been described specifically; and thus, a method for producing any one of an oxide and a hydroxide or both having a controlled ratio of the oxide to the hydroxide has been eagerly wanted.

DISCLOSURE OF THE INVENTION

Problems to be Solved by the Invention

PRIOR ART DOCUMENTS

Patent Document

Patent Document 1: Japanese Patent Laid-Open Publication No. 2010-285334
Patent Document 2: Japanese Patent Laid-Open Publication No. H11 (1999)-60246
Patent Document 3: International Patent Laid-Open Publication No. WO2009/008392

DISCLOSURE OF INVENTION

Problems to be Solved by the Invention

In view of the situation mentioned above, the present invention has an object to provide a method for producing any one of an oxide and a hydroxide or both having controlled ratio of the oxide to the hydroxide contained therein.

Means for Solving the Problems

Inventors of the present invention carried out an extensive investigation, and as a result of it, they found that, on the occasion to separate any one of an oxide and a hydroxide or both, a fluid which contains at least one kind of a metal or a metal compound as a fluid to be processed is mixed with a basic fluid which contains at least one kind of a basic substance between processing surfaces which are disposed in a position they are faced with each other so as to be able to approach to and separate from each other, at least one of which rotates relative to the other, any one of an oxide and a hydroxide or both having a controlled ratio of the oxide to the hydroxide can be obtained by changing a specific condition with regard to at least either one of the basic fluid or the fluid which contains at least one kind of a metal or a metal compound; and based on this finding, the present invention could be accomplished.

An invention according to claim 1 of the present application provides a method for producing any one of an oxide and a hydroxide or both, in which at least two kinds of fluids to be processed are used, of these at least one fluid to be processed is a fluid which contains at least one kind of a metal or a metal compound, and at least one fluid to be processed which is different from the foregoing fluid to be processed is a basic fluid which contains at least one kind of a basic substance, and further, these fluids to be processed are mixed in a thin film fluid formed between at least two processing surfaces which are disposed in a position they are faced with each other so as to be able to approach to and separate from each other, at least one of which rotates relative to the other, thereby producing any one of the oxide and the hydroxide or both by separating the oxide, the hydroxide, or a mixture of them, wherein this separation accompanied with a controlled ratio of the oxide to the hydroxide contained in any one of the oxide and the hydroxide or both is effected by changing a specific condition with regard to at least any one of the basic fluid and the fluid which contains at least one kind of a metal or a metal compound, these fluids being introduced into between the at least two processing surfaces, wherein the specific condition is at least one condition selected from the group consisting of an introduction velocity of at least any one of the basic fluid and the fluid which contains at least one kind of a metal or a metal compound and pH of at least any one of the basic fluid and the fluid which contains at least one kind of a metal or a metal compound.

As to the change of the specific condition with regard to at least either one of the basic fluid or the fluid which contains at least one kind of a metal or a metal compound, these fluids being introduced into between at least two processing surfaces, control of the introduction velocity into the processing surfaces may be done specifically by the following (1) to (3), and control of pH may be done specifically by the following (4) to (6). For this, a combination of each control of the introduction velocity by (1) to (3) and each control of pH by (4) to (6) may be used.

(1) Introduction velocity of the fluid which contains at least one kind of a metal or a metal compound into the processing surfaces is changed.
(2) Introduction velocity of at least one kind of the basic fluid into the processing surfaces is changed.

(3) Both introduction velocities of the fluid which contains at least one kind of a metal or a metal compound and at least one kind of the basic fluid into the processing surfaces are changed.
(4) A pH of the fluid which contains at least one kind of a metal or a metal compound is changed.
(5) A pH of at least one kind of the basic fluid is changed.
(6) Both pH of the fluid which contains at least one kind of a metal or a metal compound and at least one kind of the basic fluid are changed.

Elements that constitute the oxide, the hydroxide, or the mixture thereof in the present invention are not particularly restricted; and thus, all elements in the periodic table may be mentioned. Preferably, all of metal elements in the periodic table may be mentioned; and on top of them, B, Si, Ge, As, Sb, C, N, S, Te, Se, F, Cl, Br, I, and At may be mentioned. These elements may form the oxide, the hydroxide, or a mixture of them singly or as a mixture of these elements; and a composite body formed of plurality of these elements may also be mentioned.

An invention according to claim 2 of the present application provides the method for producing any one of an oxide and a hydroxide or both according to claim 1, wherein the metal or an element that constitutes the metal compound is at least one element selected from the group consisting of all of metal elements in the periodic table, B, Si, Ge, As, Sb, C, N, S, Te, Se, F, Cl, Br, I, and At.

An invention according to claim 3 of the present application provides a method for producing any one of an oxide and a hydroxide or both, wherein any one of the oxide and the hydroxide or both produced by the method for producing any one of an oxide and a hydroxide or both according to claim 1 or 2 are microparticles thereof.

An invention according to claim 4 of the present application provides a method for producing an oxide, wherein the said oxide is produced by baking the hydroxide or a mixture of the hydroxide and the oxide, these being produced by the method for producing any one of an oxide and a hydroxide or both according to any one of claims 1 to 3.

According to mere one embodiment of the present invention, the present invention may be carried out as a method for producing any one of an oxide and a hydroxide or both, wherein the method comprises:

a fluid pressure imparting mechanism for imparting a pressure to a fluid to be processed, a first processing member provided with a first processing surface of the foregoing at least two processing surfaces, a second processing member provided with a second processing surface of the foregoing at least two processing surfaces are provided, and a rotation drive mechanism for rotating these processing members relative to each other is provided; wherein each of the processing surfaces constitutes part of a sealed flow path through which the fluid to be processed under the pressure is passed, of the first and second processing members, at least the second processing member is provided with a pressure-receiving surface, and at least part of this pressure-receiving surface is comprised of the second processing surface, the pressure-receiving surface receives a pressure applied to the fluid to be processed by the fluid pressure imparting mechanism thereby generating a force to move in the direction of separating the second processing surface from the first processing surface, the fluid to be processed under the pressure is passed between the first processing surface and the second processing surface which are disposed in a position they are faced with each other so as to be able to approach to and separate from each other, at least one of which rotates relative to the other, whereby the fluid to be processed forms the thin film fluid, and the oxide, the hydroxide, or a mixture of them is separated in this thin film fluid.

According to mere another embodiment of the present invention, the present invention may be carried out as a method for producing any one of an oxide and a hydroxide or both, wherein at least one fluid of the fluids to be processed passes through both the processing surfaces while forming the thin film fluid, an another introduction path independent of the flow path for the foregoing at least one fluid is provided, at least one opening leading to this introduction path is arranged in at least either one of the first processing surface or the second processing surface, at least one fluid different from the foregoing at least one fluid is introduced between the processing surfaces through this introduction path, the fluids to be processed are mixed in the thin film fluid, and the oxide, the hydroxide, or a mixture of them is separated in this thin film fluid.

Advantages

The present invention made it possible to control the ratio of the oxide to the hydroxide in any one of the oxide and the hydroxide or both as well as to simply and continuously produce any one of the oxide and the hydroxide or both having the controlled ratio, the both of them having been considered to be difficult in conventional production methods. In addition, because it became possible to control the mixing ratio of the obtained oxide to hydroxide by a simple change of their treatment conditions, it became possible to selectively produce the oxide and the hydroxide or both having a different ratio of the oxide to the hydroxide with lower cost and energy than ever; and thus, the oxide, the hydroxide, or a mixture of them can be provided cheaply and stably. In addition, the obtained oxide, hydroxide, or a mixture of the oxide and the hydroxide can be separated as microparticles thereof; and thus, microparticles of any one of the oxide and the hydroxide or both having the controlled ratio can be produced.

BRIEF DESCRIPTION OF DRAWINGS

FIG. 1 is a schematic sectional view showing the fluid processing apparatus according to an embodiment of the present invention.

FIG. 2(A) is a schematic plane view of the first processing surface in the fluid processing apparatus shown in FIG. 1, and FIG. 2(B) is an enlarged view showing an important part of the processing surface in the apparatus.

FIG. 3(A) is a sectional view of the second introduction member of the apparatus, and FIG. 3 (B) is an enlarged view showing an important part of the processing surface for explaining the second introduction member.

Figure 1:
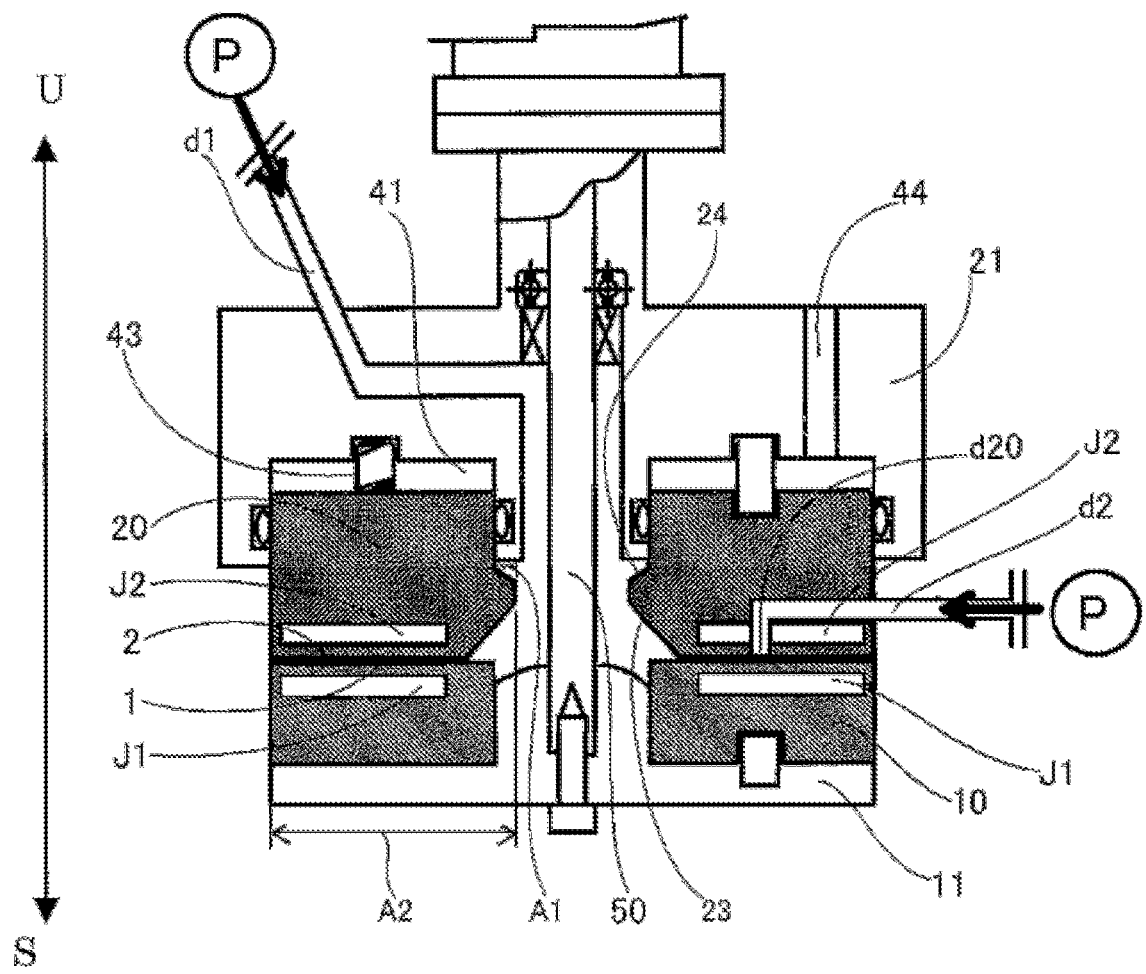
[FIG. 1]

This shows the XRD charts of the XRD measurement results of the microparticles of zinc oxide, zinc hydroxide, or a mixture of them obtained in Examples 1, 3, 5, and 6 of the present invention.

BEST MODES FOR CARRYING OUT THE INVENTION

Hereunder, one embodiment of the present invention will be specifically explained.

Outline:

The present invention relates to a method for producing any one of an oxide and a hydroxide or both, wherein, as fluids to be processed, a fluid which contains at least one kind of a metal or a metal compound is mixed with a basic fluid which contains at least one kind of a basic substance in a thin film fluid formed between at least two processing surfaces which are disposed in a position they are faced with each other so as to be able to approach to and separate from each other, at least one of which rotates relative to the other, thereby separating the oxide, the hydroxide, or a mixture of them. This utilizes difference of the rates of producing respective products by pH during the time of separating the oxide, the hydroxide, or a mixture of the oxide and the hydroxide by reacting a metal or a metal compound with a basic substance under various conditions, whereas, in conventional methods, a ratio of the oxide to the hydroxide in the obtained any one of the oxide and the hydroxide or both could not be controlled. Accordingly, in the present invention, it was found that any one of the oxide and the hydroxide or both having a controlled ratio of the oxide to the hydroxide could be obtained by changing, during the time of mixing these fluids to be processed to separate the oxide, the hydroxide, or a mixture of them, a specific condition with regard to at least either one of the basic fluid or the fluid which contains at least one kind of a metal or a metal compound, these fluids being introduced into between at least two processing surfaces; and based on this finding, the present invention could be accomplished. This specific condition is at least one condition selected from the group consisting of an introduction velocity of any one of the basic fluid and the fluid which contains at least one kind of a metal or a metal compound or both and pH of any one of the basic fluid and the fluid which contains at least one kind of a metal or a metal compound or both.

Any one of the oxide and the hydroxide or both in the present invention is not restricted. Illustrative example thereof includes an oxide shown by the formula $M_xO_y$, a hydroxide shown by the formula $M_p(OH)_q$, a hydroxylated oxide shown by the formula $M_r(OH)_sO_t$, a solvent adduct of them, and a composition mainly comprised of them (in the formula, each of the reference characters x, y, p, q, r, s, and t represents an arbitrary integer). Any one of these oxides and hydroxides or both include a peroxide and a superoxide.

Elements Contained in the Oxide, the Hydroxide, or a Mixture of them:

Elements that constitute the oxide, the hydroxide, or a mixture of them in the present invention are not particularly restricted. Preferably, any one of an oxide and a hydroxide or both formed of all metal elements in the periodic table may be mentioned. In the present invention, in addition to these metal elements, B, Si, Ge, As, Sb, C, N, S, Te, Se, F, Cl, Br, I, and At may be mentioned. These elements may form the oxide, the hydroxide, or a mixture of them singly or as a mixture of these elements; and a composite body formed of plurality of these elements may also be mentioned.

Raw Materials (Metal or Metal Compound):

The metal in the present invention is not particularly restricted. Preferably, all of the metal elements shown in the periodic table may be mentioned. In the present invention, in addition to these metal elements, non-metal elements such as B, Si, Ge, As, Sb, C, N, O, S, Te, Se, F, Cl, Br, I, and At may be mentioned. These metals may be constituted of a single element; or an alloy formed of a plurality of elements or a substance which contains a metal element and a non-metal element may be mentioned.

In the present invention, a compound of the foregoing metals (including the non-metallic elements mentioned above) is called a metal compound. The metals or the metal compounds in the present invention are not particularly restricted; a single body of the metals or a compound thereof may be mentioned. The metal compound is not particularly restricted; and illustrative example thereof includes metal compounds in the form of a metal salt, an oxide, a hydroxide, a hydroxylated oxide, a nitride, a carbide, a complex, an organic salt, an organic complex, an organic compound, and a hydrate and an organic solvent adduct of them. The metal salt is not particularly restricted; and illustrative example thereof includes a nitrate salt, a nitrite salt, a sulfate salt, a sulfite salt, a formate salt, an acetate salt, a phosphate salt, a phosphite salt, a hypophosphite salt, a chloride, an oxy salt, and an acetylacetonato salt, and a hydrate or a solvent adduct of them. Illustrative example of the organic compound includes a metal alkoxide. In the above, these metal compounds may be used singly or as a mixture of a plurality of them.

In the present invention, a fluid which contains at least one kind of the foregoing metals or metal compounds is used; and in the case that these metals or metal compounds are in the state of a solid, it is preferable that the metals or the metal compounds be used in the state of being melted or in the state of being mixed or dissolved in a solvent as mentioned later. This fluid which contains at least one kind of the metal or the metal compound includes a fluid which contains the metal or the metal compound in the state of dispersion solution or slurry for use.

Basic Substance and Basic Fluid:

As to the basic substance to be used in the present invention, there is no particular restriction; and illustrative example thereof includes an ammonia, an amine, a hydroxide of a metal or a non-metal, a carbonate salt, a hydrogen carbonate salt, and an alkoxide. In addition, a hydrazine and a hydrazine monohydrate may be mentioned. These basic substances include those in the form of a hydrate, a solvent adduct, and an anhydride. These basic substances each may be used singly or as a mixture of plurality of them. In the present invention, these basic substances are used as the basic fluid which contains at least one of them; and in the case that these basic substances are in the state of a solid, it is preferable that the basic substances be used in the state of being melted or in the state of being mixed or dissolved in a solvent as mentioned later. This basic fluid includes a fluid which is in the state of dispersion solution or slurry for use.

Solvent:

The solvent to be used in the present invention is not particularly restricted; and illustrative example thereof includes water such as an ion-exchanged water, a RO water, a pure water, and a ultrapure water; an alcoholic organic solvent such as methanol and ethanol; a polyol (polyvalent alcohol) solvent such as ethylene glycol, propylene glycol, trimethylene glycol, tetraethylene glycol, polyethylene glycol, and glycerin; a ketonic organic solvent such as acetone and methyl ethyl ketone; an ester organic solvent such as ethyl acetate and butyl acetate; an ether organic solvent such as dimethyl ether and dibutyl ether; an aromatic organic solvent such as benzene, toluene, and xylene; and an aliphatic hydrocarbon organic solvent such as hexane and pentane. These solvents may be used singly or as a mixture of a plurality of them.

Fluid Processing Apparatus:

In the present invention, it is preferable that mixing of the fluid which contains at least one kind of a metal or a metal compound with a basic fluid which contains at least one kind of a basic substance be done by stirring and mixing in a thin film fluid formed between processing surfaces which are disposed in a position they are faced with each other so as to be able to approach to and separate from each other, at least one of which rotates relative to the other; and thus, for example, it is preferable that an oxide, a hydroxide, or a mixture of them be separated by mixing by using an apparatus based on the same principle as that of the apparatus shown in Patent Document 3 filed by the present applicant. By using the apparatus based on the principle like this, not only the mixing ratio of the oxide to the hydroxide can be strictly controlled, but also the oxide, the hydroxide, or a mixture of them can be separated as microparticles thereof; and thus, any one of the oxide microparticles and the hydroxide microparticles or both can be produced.

Hereunder, embodiments of the above-mentioned fluid processing apparatus will be explained with referring to the drawings.

Figure 2:
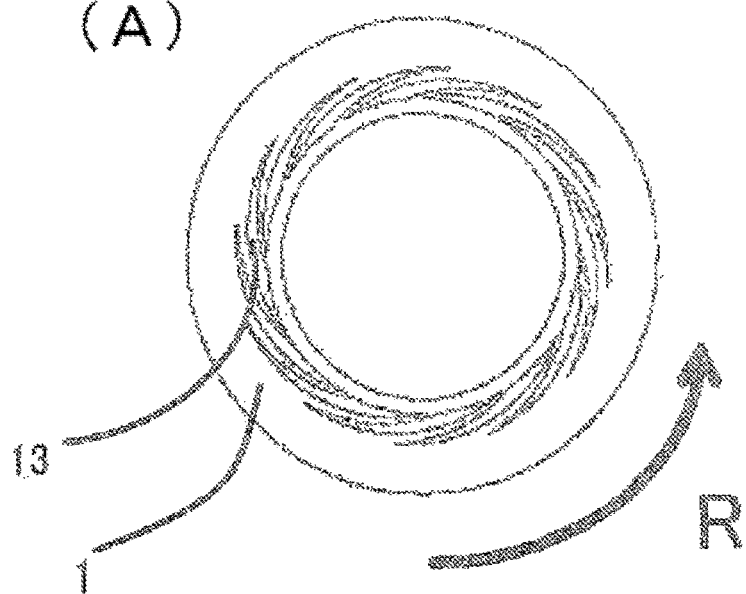
[FIG. 2]
Figure 2:
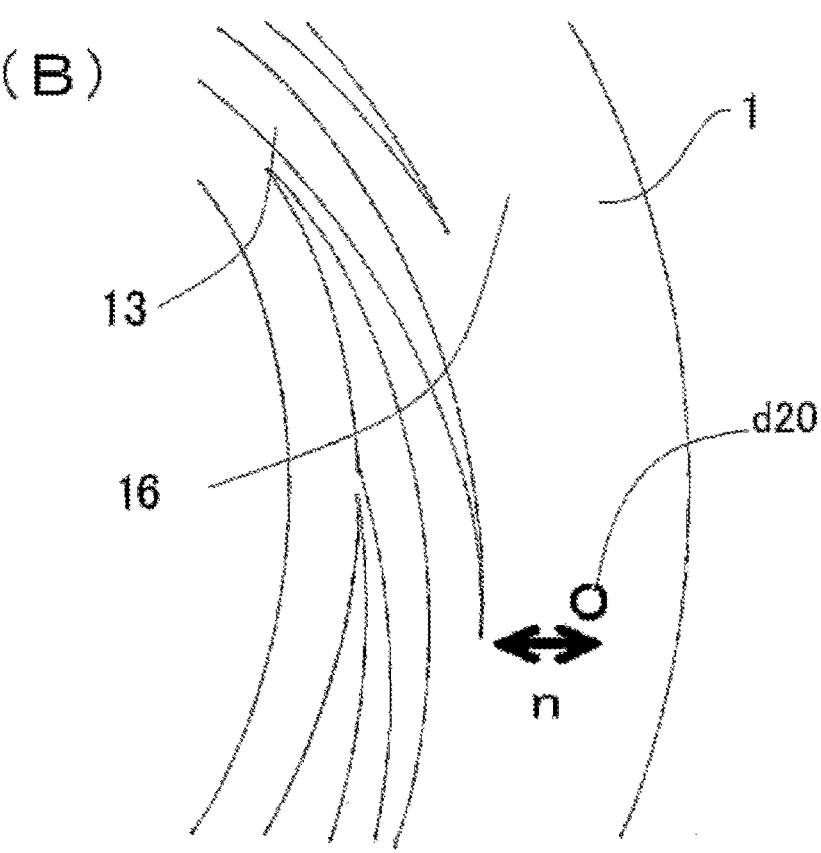
Figure 3:
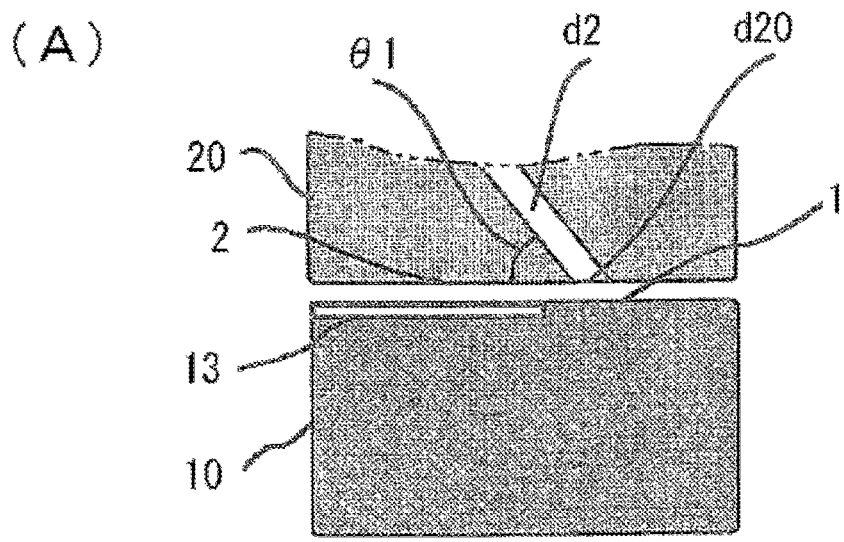
[FIG. 3]
Figure 3:
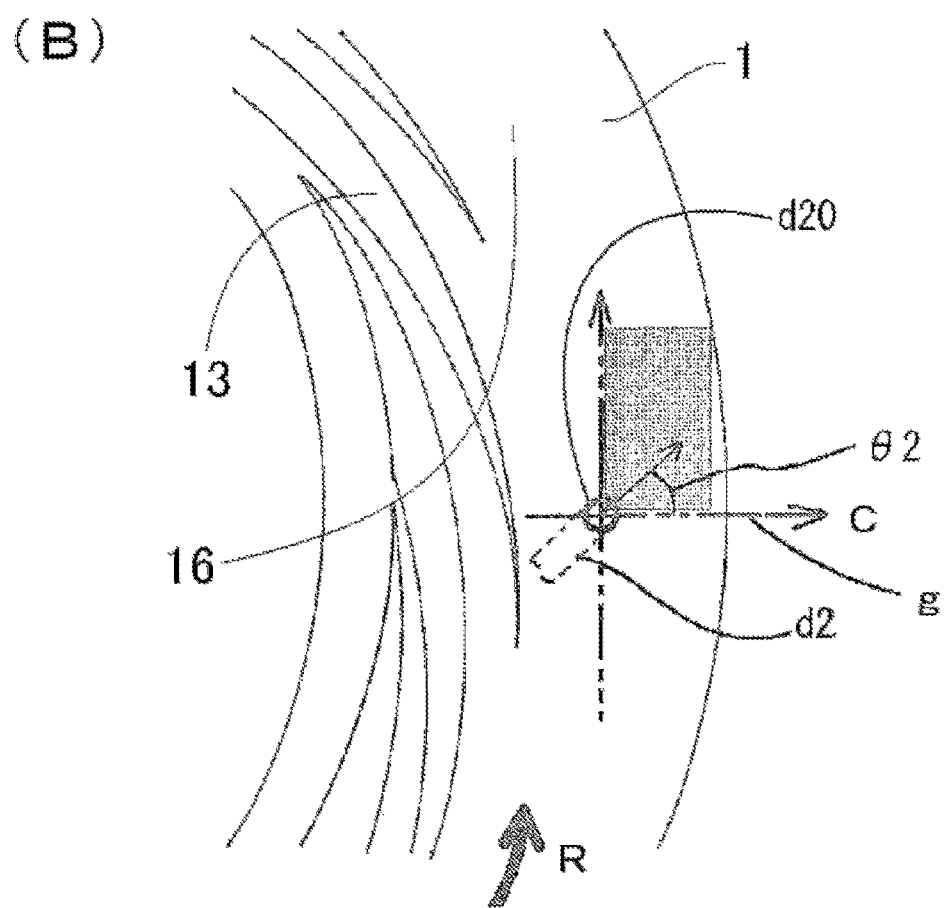

The fluid processing apparatus shown in FIG. 1 to FIG. 3 is similar to the apparatus described in Patent Document 3, with which a material to be processed is processed between processing surfaces in processing members arranged so as to be able to approach to and separate from each other, at least one of which rotates relative to the other; wherein, of the fluids to be processed, a first fluid to be processed, i.e., a first fluid, is introduced into between the processing surfaces, and a second fluid to be processed, i.e., a second fluid, is introduced into between the processing surfaces from a separate path that is independent of the flow path introducing the afore-mentioned first fluid and has an opening leading to between the processing surfaces, whereby the first fluid and the second fluid are mixed and stirred between the processing surfaces. Meanwhile, in FIG. 1, a reference character U indicates an upside and a reference character S indicates a downside; however, up and down, frond and back and right and left shown therein indicate merely a relative positional relationship and does not indicate an absolute position. In FIG. 2(A) and FIG. 3(B), reference character R indicates a rotational direction. In FIG. 3(C), reference character C indicates a direction of centrifugal force (a radial direction).

In this apparatus provided with processing surfaces arranged opposite to each other so as to be able to approach to and separate from each other, at least one of which rotates relative to the other, at least two kinds of fluids to be processed are used as the fluid to be processed, wherein at least one fluid thereof contains at least one kind of material to be processed, a thin film fluid is formed by converging the respective fluids between these processing surfaces, and the material to be processed is processed in this thin film fluid. With this apparatus, a plurality of fluids to be processed may be processed as mentioned above; but a single fluid to be processed may be processed as well.

This fluid processing apparatus is provided with two processing members of a first processing member 10 and a second processing member 20 arranged opposite to each other, wherein at least one of these processing members rotates. The surfaces arranged opposite to each other of the respective processing members 10 and 20 are made to be the respective processing surfaces. The first processing member 10 is provided with a first processing surface 1 and the second processing member 20 is provided with a second processing surface 2.

The processing surfaces 1 and 2 are connected to a flow path of the fluid to be processed and constitute part of the flow path of the fluid to be processed. Distance between these processing surfaces 1 and 2 can be changed as appropriate; and thus, the distance thereof is controlled so as to form a minute space usually less than 1 mm, for example, in the range of about 0.1 μm to about 50 μm. With this, the fluid to be processed passing through between the processing surfaces 1 and 2 becomes a forced thin film fluid forced by the processing surfaces 1 and 2.

When a plurality of fluids to be processed are processed by using this apparatus, the apparatus is connected to a flow path of the first fluid to be processed whereby forming part of the flow path of the first fluid to be processed; and part of the flow path of the second fluid to be processed other than the first fluid to be processed is formed. In this apparatus, the two paths converge into one, and two fluids to be processed are mixed between the processing surfaces 1 and 2 so that the fluids may be processed by reaction and so on. It is noted here that the term "process(ing)" includes not only the embodiment wherein a material to be processed is reacted but also the embodiment wherein a material to be processed is only mixed or dispersed without accompanying reaction.

To specifically explain, this apparatus is provided with a first holder 11 for holding the first processing member 10, a second holder 21 for holding the second processing member 20, a surface-approaching pressure imparting mechanism, a rotation drive member, a first introduction part d1, a second introduction part d2, and a fluid pressure imparting mechanism p.

As shown in FIG. 2(A), in this embodiment, the first processing member 10 is a circular body, or more specifically a disk with a ring form. Similarly, the second processing member 20 is a disk with a ring form. A material of the processing members 10 and 20 is not only metal but also carbon, ceramics, sintered metal, abrasion-resistant steel, sapphire, other metal subjected to hardening treatment, and rigid material subjected to lining, coating, or plating. In the processing members 10 and 20 of this embodiment, at least part of the first and the second surfaces 1 and 2 arranged opposite to each other is mirror-polished.

Roughness of this mirror polished surface is not particularly limited; but surface roughness Ra is preferably 0.01 μm to 1.0 μm, or more preferably 0.03 μm to 0.3 μm.

At least one of the holders can rotate relative to the other holder by a rotation drive mechanism such as an electric motor (not shown in drawings). A reference numeral 50 in FIG. 1 indicates a rotary shaft of the rotation drive mechanism; in this embodiment, the first holder 11 attached to this rotary shaft 50 rotates, and thereby the first processing member 10 attached to this first holder 11 rotates relative to the second processing member 20. As a matter of course, the second processing member 20 may be made to rotate, or the both may be made to rotate. Further in this embodiment, the first and second holders 11 and 21 may be fixed, while the first and second processing members 10 and 20 may be made to rotate relative to the first and second holders 11 and 21.

At least any one of the first processing member 10 and the second processing member 20 is able to approach to and separate from at least any other member, thereby the processing surfaces 1 and 2 are able to approach to and separate from each other.

In this embodiment, the second processing member 20 approaches to and separates from the first processing member 10, wherein the second processing member 20 is accepted in an accepting part 41 arranged in the second holder 21 so as to be able to rise and set. However, as opposed to the above, the first processing member 10 may approach to and separate from the second processing member 20, or both of the processing members 10 and 20 may approach to and separate from each other.

This accepting part 41 is a concave portion for mainly accepting that side of the second processing member 20 opposite to the second processing surface 2, and this concave portion is a groove being formed into a circle, i.e., a ring when viewed in a plane. This accepting part 41 accepts the second processing member 20 with sufficient clearance so that the second processing member 20 may rotate. Meanwhile, the second processing member 20 may be arranged so as to be movable only parallel to the axial direction; alternatively, the second processing member 20 may be made movable, by making this clearance larger, relative to the accepting part 41 so as to make the center line of the processing member 20 inclined, namely unparallel, to the axial direction of the accepting part 41, or movable so as to deviate the center line of the processing member 20 and the center line of the accepting part 41 toward the radius direction.

It is preferable that the second processing member 20 be accepted by a floating mechanism so as to be movable in the three dimensional direction, as described above.

The fluids to be processed are introduced into between the processing surfaces 1 and 2 from the first introduction part d1 and the second introduction part d2 under the state that pressure is applied thereto by a fluid pressure imparting mechanism p consisting of various pumps, potential energy, and so on. In this embodiment, the first introduction part d1 is a flow path arranged in the center of the circular second holder 21, and one end thereof is introduced into between the processing surfaces 1 and 2 from inside the circular processing members 10 and 20. Through the second introduction part d2, the second fluid to be processed for reaction to the first fluid to be processed is introduced into between the processing surfaces 1 and 2. In this embodiment, the second introduction part d2 is a flow path arranged inside the second processing member 20, and one end thereof is open at the second processing surface 2. The first fluid to be processed which is pressurized with the fluid pressure imparting mechanism p is introduced from the first introduction part d1 to the space inside the processing members 10 and 20 so as to pass through between the first and second processing surfaces 1 and 2 to outside the processing members 10 and 20. From the second introduction part d2, the second fluid to be processed which is pressurized with the fluid pressure imparting mechanism p is provided into between the processing surfaces 1 and 2, whereat this fluid is converged with the first fluid to be processed, and there, various fluid processing such as mixing, stirring, emulsification, dispersion, reaction, deposition, crystallization, and separation are effected, and then the fluid thus processed is discharged from the processing surfaces 1 and 2 to outside the processing members 10 and 20. Meanwhile, an environment outside the processing members 10 and 20 may be made negative pressure by a vacuum pump.

The surface-approaching pressure imparting mechanism mentioned above supplies the processing members with force exerting in the direction of approaching the first processing surface 1 and the second processing surface 2 each other. In this embodiment, the surface-approaching pressure imparting mechanism is arranged in the second holder 21 and biases the second processing member 20 toward the first processing member 10.

The surface-approaching pressure imparting mechanism is a mechanism to generate a force (hereinafter "surface-approaching pressure") to press the first processing surface 1 of the first processing member 10 and the second processing surface 2 of the second processing member 20 in the direction to make them approach to each other. By the balance between this surface-approaching pressure and the force to separate the processing surfaces 1 and 2 from each other, i.e., the force such as the fluid pressure, a thin film fluid having minute thickness in a level of nanometer or micrometer is generated. In other words, the distance between the processing surfaces 1 and 2 is kept in a predetermined minute distance by the balance between these forces.

In the embodiment shown in FIG. 1, the surface-approaching pressure imparting mechanism is arranged between the accepting part 41 and the second processing member 20. Specifically, the surface-approaching pressure imparting mechanism is composed of a spring 43 to bias the second processing member 20 toward the first processing member 10 and a biasing-fluid introduction part 44 to introduce a biasing fluid such as air and oil, wherein the surface-approaching pressure is provided by the spring 43 and the fluid pressure of the biasing fluid. The surface-approaching pressure may be provided by any one of this spring 43 and the fluid pressure of this biasing fluid; and other forces such as magnetic force and gravitation may also be used. The second processing member 20 recedes from the first processing member 10 thereby making a minute space between the processing surfaces by separating force, caused by viscosity and the pressure of the fluid to be processed applied by the fluid pressure imparting mechanism p, against the bias of this surface-approaching pressure imparting mechanism. By this balance between the surface-approaching pressure and the separating force as mentioned above, the first processing surface 1 and the second processing surface 2 can be set with the precision of a micrometer level; and thus the minute space between the processing surfaces 1 and 2 may be set. The separating force mentioned above includes fluid pressure and viscosity of the fluid to be processed, centrifugal force by rotation of the processing members, negative pressure when negative pressure is applied to the biasing-fluid introduction part 44, and spring force when the spring 43 works as a pulling spring. This surface-approaching pressure imparting mechanism may be arranged also in the first processing member 10, in place of the second processing member 20, or in both of the processing members.

To specifically explain the separation force, the second processing member 20 has the second processing surface 2 and a separation controlling surface 23 which is positioned inside the processing surface 2 (namely at the entering side of the fluid to be processed into between the first and second processing surfaces 1 and 2) and next to the second processing surface 2. In this embodiment, the separation controlling surface 23 is an inclined plane, but may be a horizontal plane. The pressure of the fluid to be processed acts to the separation controlling surface 23 to generate force directing to separate the second processing member 20 from the first processing member 10. Therefore, the second processing surface 2 and the separation controlling surface 23 constitute a pressure receiving surface to generate the separation force.

In the example shown in FIG. 1, an approach controlling surface 24 is formed in the second processing member 20. This approach controlling surface 24 is a plane opposite, in the axial direction, to the separation controlling surface 23

(upper plane in FIG. 1) and, by action of pressure applied to the fluid to be processed, generates force of approaching the second processing member 20 toward the first processing member 10.

Meanwhile, the pressure of the fluid to be processed exerted on the second processing surface 2 and the separation controlling surface 23, i.e., the fluid pressure, is understood as force constituting an opening force in a mechanical seal. The ratio (area ratio A1/A2) of a projected area A1 of the approach controlling surface 24 projected on a virtual plane perpendicular to the direction of approaching and separating the processing surfaces 1 and 2, that is, to the direction of rising and setting of the second processing member 20 (axial direction in FIG. 1), to a total area A2 of the projected area of the second processing surface 2 of the second processing member 20 and the separation controlling surface 23 projected on the virtual plane is called as balance ratio K, which is important for control of the opening force. This opening force can be controlled by the pressure of the fluid to be processed, i.e., the fluid pressure, by changing the balance line, i.e., by changing the area A1 of the approach controlling surface 24.

Sliding surface actual surface pressure P, i.e., the fluid pressure out of the surface-approaching pressures, is calculated according to the following equation:

$$P = P1 \times (K-k) + Ps$$

Here, P1 represents the pressure of a fluid to be processed, i.e., the fluid pressure, K represents the balance ratio, k represents an opening force coefficient, and Ps represents a spring and back pressure.

By controlling this balance line to control the sliding surface actual surface pressure P, the space between the processing surfaces 1 and 2 is formed as a desired minute space, thereby forming a fluid film of the fluid to be processed so as to make the processed substance such as a product fine and to effect uniform processing by reaction.

Meanwhile, the approach controlling surface 24 may have a larger area than the separation controlling surface 23, though this is not shown in the drawing.

The fluid to be processed becomes a forced thin film fluid by the processing surfaces 1 and 2 that keep the minute space therebetween, whereby the fluid is forced to move out from the circular, processing surfaces 1 and 2. However, the first processing member 10 is rotating; and thus, the mixed fluid to be processed does not move linearly from inside the circular, processing surfaces 1 and 2 to outside thereof, but does move spirally from the inside to the outside thereof by a resultant vector acting on the fluid to be processed, the vector being composed of a moving vector toward the radius direction of the circle and a moving vector toward the circumferential direction.

Meanwhile, a rotary shaft 50 is not only limited to be placed vertically, but may also be placed horizontally, or at a slant. This is because the fluid to be processed is processed in a minute space between the processing surfaces 1 and 2 so that the influence of gravity can be substantially eliminated. In addition, this surface-approaching pressure imparting mechanism can function as a buffer mechanism of microvibration and rotation alignment by concurrent use of the foregoing floating mechanism with which the second processing member 20 may be held displaceably.

In the first and second processing members 10 and 20, the temperature thereof may be controlled by cooling or heating at least any one of them; in FIG. 1, an embodiment having temperature regulating mechanisms J1 and J2 in the first and second processing members 10 and 20 is shown. Alternatively, the temperature may be regulated by cooling or heating the introducing fluid to be processed. These temperatures may be used to separate the processed substance or may be set so as to generate Benard convection or Marangoni convection in the fluid to be processed between the first and second processing surfaces 1 and 2.

As shown in FIG. 2, in the first processing surface 1 of the first processing member 10, a groove-like depression 13 extended toward an outer side from the central part of the first processing member 10, namely in a radius direction, may be formed. The depression 13 may be, as a plane view, curved or spirally extended on the first processing surface 1 as shown in FIG. 2(B), or, though not shown in the drawing, may be extended straight radially, or bent at a right angle, or jogged; and the depression may be continuous, intermittent, or branched. In addition, this depression 13 may be formed also on the second processing surface 2, or on both of the first and second processing surfaces 1 and 2. By forming the depression 13 as mentioned above, the micro-pump effect can be obtained so that the fluid to be processed may be sucked into between the first and second processing surfaces 10 and 20.

The base end of the depression 13 reaches preferably inner circumference of the first processing member 10. The front end of the depression 13 extends in an outer circumferential direction of the first processing surface 1 with the depth thereof (cross-sectional area) being gradually shallower as going from the base end toward the front end.

Between the front end of the depression 13 and the outer periphery of the first processing surface 1 is arranged a flat surface 16 not having the depression 13.

When an opening d20 of the second introduction part d2 is arranged in the second processing surface 2, the arrangement is done preferably at a position opposite to the flat surface 16 of the first processing surface 1 arranged at a position opposite thereto.

This opening d20 is arranged preferably in the downstream (outside in this case) of the depression 13 of the first processing surface 1. The opening is arranged especially preferably at a position opposite to the flat surface 16 located nearer to the outer diameter than a position where the direction of flow upon introduction by the micro-pump effect is changed to the direction of a spiral and laminar flow formed between the processing surfaces. Specifically, in FIG. 2(B), a distance n from the outermost side of the depression 13 arranged in the first processing surface 1 in the radial direction is preferably about 0.5 mm or more. Especially in the case of separating microparticles from a fluid, it is preferable that mixing of a plurality of fluids to be processed and separation of the microparticles therefrom be effected under the condition of a laminar flow.

This second introduction part d2 may have directionality. For example, as shown in FIG. 3(A), the direction of introduction from the opening d20 of the second processing surface 2 is inclined at a predetermined elevation angle ($\theta1$) relative to the second processing surface 2. The elevation angle ($\theta1$) is set at more than 0° and less than 90°, and when the reaction speed is high, the angle ($\theta1$) is preferably set in the range of 1° to 45°.

In addition, as shown in FIG. 3(B), introduction from the opening d20 of the second processing surface 2 has directionality in a plane along the second processing surface 2. The direction of introduction of this second fluid is in the outward direction departing from the center in a radial component of the processing surface and in the forward direction in a rotation component of the fluid between the rotating processing surfaces. In other words, a predetermined angle ($\theta2$) exists facing the rotation direction R from a reference line g, which is the line to the outward direction and in the radial direction passing through the opening d20. This angle (θ2) is also set preferably at more than 0° and less than 90°.

This angle (θ2) can vary depending on various conditions such as the type of fluid, the reaction speed, viscosity, and the rotation speed of the processing surface. In addition, it is also possible not to give the directionality to the second introduction part d2 at all.

In the embodiment shown in FIG. 1, kinds of the fluid to be processed and numbers of the flow path thereof are set two respectively; but they may be one, or three or more. In the embodiment shown in FIG. 1, the second fluid is introduced into between the processing surfaces 1 and 2 from the introduction part d2; but this introduction part may be arranged in the first processing member 10 or in both. Alternatively, a plurality of introduction parts may be arranged relative to one fluid to be processed. The opening for introduction arranged in each processing member is not particularly restricted in its form, size, and number; and these may be changed as appropriate. The opening of the introduction part may be arranged just before the first and second processing surfaces 1 and 2 or in the side of further upstream thereof.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

In the above-mentioned apparatus, a treatment such as separation/precipitation and crystallization is effected while being mixed forcibly and uniformly between the processing surfaces 1 and 2 which are disposed in a position they are faced with each other so as to be able to approach to and separate from each other, at least one of which rotates relative to the other, as shown in FIG. 1. Particle diameter and monodispersity of the treated substance to be processed can be controlled by appropriately controlling rotation speed of the processing members 10 and 20, distance between the processing surfaces 1 and 2, concentration of raw materials in the fluids to be processed, kind of solvents in the fluids to be processed, and so forth.

Hereunder, specific embodiments as to the method for producing any one of the oxide and the hydroxide or both by using the above-mentioned apparatus will be explained.

In the apparatus, a fluid which contains at least one kind of a metal or a metal compound is mixed as the fluid to be processed with a basic fluid which contains at least one kind of a basic substance in the thin fluid formed between the processing surfaces which are disposed in a position they are faced with each other so as to be able to approach to and separate from each other, at least one of which rotates relative to the other, thereby separating an oxide, a hydroxide, or a mixture of the oxide and the hydroxide. On this occasion, the mixing ratio of the oxide to the hydroxide in any one of the separated oxide and hydroxide or both is controlled by changing a specific condition with regard to at least either one of the basic fluid or the fluid which contains at least one kind of a metal or a metal compound, these fluids being introduced into between the processing surfaces 1 and 2. Here, the specific condition is at least one condition selected from the group consisting of an introduction velocity of at least any one of the basic fluid and the fluid which contains at least one kind of a metal or a metal compound and pH of at least any one of the basic fluid and the fluid which contains at least one kind of a metal or a metal compound.

The reaction to separate any one of the oxide and the hydroxide or both takes place in the apparatus as shown in FIG. 1 while being mixed forcibly and uniformly between the processing surfaces 1 and 2 which are disposed in a position they are faced with each other so as to be able to approach to and separate from each other, at least one of which rotates relative to the other.

At first, a basic fluid which contains at least one kind of the basic substance is introduced as the first fluid from the first introduction part d1, which is one flow path, into between the processing surfaces 1 and 2 which are disposed in a position they are faced with each other so as to be able to approach to and separate from each other, at least one of which rotates relative to the other, thereby forming between the processing surfaces a first fluid film which is a thin film fluid formed of the first fluid.

Then, the fluid which contains at least one kind of a metal or a metal compound is introduced as the second fluid into the first fluid film formed between the processing surfaces 1 and 2 from the second introduction part d2 which is another flow path.

By so doing, the first fluid and the second fluid are mixed between the processing surfaces 1 and 2 while the distance therebetween is fixed by pressure balance between the supply pressure of the fluids to be processed and the pressure applied between the rotating processing surfaces, thereby effecting the reaction to separate any one of the oxide and the hydroxide or both.

To effect the reaction between the processing surfaces 1 and 2, the second fluid may be introduced through the first introduction part d1 and the first fluid through the second introduction part d2, as opposed to the above description. That is, the expression "first" or "second" for each solvent has a meaning for merely discriminating an $n^{th}$ solvent among a plurality of solvents present, and third or more solvents can also be present.

As mentioned before, the processing apparatus may be provided with, in addition to the first introduction part d1 and the second introduction part d2, the third introduction part d3; and in this case, for example, each of the fluids which contain a later-mentioned pH-controlling agent may be introduced into the apparatus as the first fluid, the second fluid, and the third fluid. By so doing, concentration and pressure of each solution can be controlled separately so that the separation reaction and stabilization of particle diameter of the microparticles may be controlled more precisely. Meanwhile, a combination of the fluids to be processed (first to third fluids) that are introduced into each of the introduction parts may be set arbitrarily. The same is applied if the fourth or more introduction parts are arranged; and by so doing, fluids to be introduced into the processing apparatus may be subdivided. In this case, the pH-controlling agent may be contained at least in the third fluid, at least in either one of the first fluid or the second fluid or neither in the first fluid nor the second fluid.

In addition, temperatures of the fluids to be processed such as the first fluid, the second fluid, and so on may be controlled; and temperature difference among the first fluid, the second fluid, and so on (namely, temperature difference among each of the supplied fluids to be processed) may be controlled either. To control temperature and temperature difference of each of the supplied fluids to be processed, a mechanism with which temperature of each of the fluids to be processed is measured (temperature of the fluid before introduction to the processing apparatus, or in more detail, just before introduction into between the processing surfaces 1 and 2) so that each of the fluids to be processed that is introduced into between the processing surfaces 1 and 2 may be heated or cooled may be installed.

Change of the Introduction Velocity:

In the present invention, the mixing ratio of the obtained oxide to hydroxide may be controlled by changing the introduction velocity of at least any one of the basic fluid and the fluid which contains at least one kind of a metal or a metal compound, these fluids being introduced into between the processing surfaces 1 and 2. When this method is used, there is a merit that the mixing ratio of the basic substance to a metal, a metal compound, or a metal ion can be readily controlled by mere changing of the introduction velocity of at least any one of the basic fluid and the fluid which contains at least one kind of a metal or a metal compound; and as a result, the mixing ratio of the oxide to the hydroxide can be readily controlled, so that the ratio of the oxide to the hydroxide may be controlled to the intended ratio without investigation of complicated treatment conditions that has been required before. In the fluid processing apparatus, the introduction velocity of at least anyone of the first fluid (basic fluid) introduced from the first introduction part d1 and the second fluid (fluid which contains at least one kind of a metal or a metal compound) introduced from the second introduction part d2 may be changed; and as mentioned before, the second fluid may be introduced from the first introduction part d1 and the first fluid may be introduced from the second introduction part d2.

The method to change the introduction velocity of at least any one of the basic fluid and the fluid which contains at least one kind of a metal or a metal compound, these fluids being introduced into between the processing surfaces 1 and 2, is not particularly restricted. The introduction velocity of at least any one of the basic fluid and the fluid which contains at least one kind of a metal or a metal compound, these fluids being introduced into between the processing surfaces 1 and 2, may be changed by using the fluid pressure imparting mechanism p of the fluid processing apparatus, or the introduction velocity of at least any one of the basic fluid and the fluid which contains at least one kind of a metal or a metal compound, these fluids being introduced into between the processing surfaces 1 and 2, may be changed by using a fluid sending apparatus such as a pump. Alternatively, the introduction velocity of any one of the basic fluid and the fluid which contains at least one kind of a metal or a metal compound, these fluids being introduced into between the processing surfaces 1 and 2, may be changed by a forced sending system which uses a gas such as an air and a nitrogen gas. A combined embodiment of the fluid pressure imparting mechanism p, the fluid sending apparatus such as a pump, and the forced sending system by a gas may also be used.

Microparticles:

In the present invention, because any one of the oxide and the hydroxide or both are separated between the processing surfaces 1 and 2 which are capable of approaching to and separating from each other, any one of the oxide and the hydroxide or both having the mixing ratio of the oxide to the hydroxide precisely controlled can be separated as microparticles thereof. The particle diameter thereof can be readily controlled as well by changing the revolution number of the processing members 10 and 20 of the fluid processing apparatus, the introduction velocity of the fluids to be processed into the fluid processing apparatus, temperature, treatment conditions, and so forth; and thus, the mixing ratio of the oxide to the hydroxide as well as the particle diameter may be controlled simultaneously. Particle diameter of anyone of the oxide microparticles and the hydroxide microparticles or both obtained by carrying out the present invention is not particularly restricted. Microparticles having the average particle diameter of 1 mm or less, nanoparticles having the average particle diameter of less than 1 µM, and particles having the average particle diameter of more than these values may be mentioned.

Mixture:

In the present invention, the mixing ratio of the oxide to the hydroxide in any one of the obtained oxide and hydroxide or both is controlled, wherein the mixing state thereof may be such that each of the oxide and the hydroxide exists singularly, or for example, such that the oxide and the hydroxide exist in the state of mixture in a single particle.

Mixing Ratio:

In the present invention, the mixing ratio of the oxide to the hydroxide is controlled, wherein the embodiment thereof may be such that any one of the obtained oxide and hydroxide or both is the oxide alone (not containing the hydroxide) or the hydroxide alone (not containing the oxide).

Control of pH:

In the present invention, the mixing ratio of the obtained oxide to hydroxide can be controlled readily by changing pH of at least any one of the basic fluid and the fluid which contains at least one kind of a metal or a metal compound, these fluids being introduced into between the processing surfaces 1 and 2. Specifically, though not particularly restricted, pH may be changed by containing the later-mentioned pH controlling agent in at least any one of the basic fluid and the fluid which contains at least one kind of a metal or a metal compound; or pH may be changed by changing dissolving concentration of the metal or the metal compound in a solvent, or by changing concentration of the basic substance contained in the basic fluid. Alternatively, pH of at least any one of the basic fluid and the fluid which contains at least one kind of a metal or a metal compound may be changed by methods such as the method in which a plurality of a metal and a metal compound or both are dissolved in a solvent and the method in which the basic fluid is made to contain a plurality of basic substances. By the pH controlling methods as mentioned above, the mixing ratio of the oxide to the hydroxide can be readily controlled; and thus, any one of the oxide and the hydroxide or both may be selectively produced in accordance with an intended object.

Substance for pH Control:

As to the pH control substance to control pH, there is no particular restriction; and illustrative example thereof includes an inorganic or an organic acidic substance such as hydrochloric acid, sulfuric acid, nitric acid, aqua regia, trichioroacetic acid, trifluoroacetic acid, phosphoric acid, citric acid, and ascorbic acid; a metal hydroxide such as sodium hydroxide and potassium hydroxide; an amine such as triethylamine and dimethylaminoethanol; a basic substance such as ammonia; and salts of the foregoing acidic substances and basic substances. The foregoing pH controlling agents may be used singly or as a mixture of a plurality of them. By changing mixing amount of the pH controlling agent into any one of the basic fluid and the fluid which contains at least one kind of a metal or a metal compound or both, or by changing concentration of any one of the basic fluid and the fluid which contains at least one kind of a metal or a metal compound or both, pH of at least any one of the basic fluid and the fluid which contains at least one kind of a metal or a metal compound or both can be changed.

The foregoing pH controlling agent may be contained in the fluid which contains at least one kind of a metal or a metal compound, or in the basic fluid, or in the both fluids. Alternatively, the pH controlling agent may be contained in a third fluid that is different from the basic fluid and the fluid which contains at least one kind of a metal or a metal compound.

Range of pH:

In the present invention, pH of any one of the basic fluid and the fluid which contains at least one kind of a metal or a metal compound or both is not particularly restricted; but as to the basic fluid, pH of 7 or higher is preferable, and pH of 9 or higher is more preferable. There is no particular restriction as to pH after mixing of the basic fluid with the fluid which contains at least one kind of a metal or a metal compound. The pH can be appropriately changed in accordance with the kind of a metal or a metal compound to be used, the object, the kind of any one of the oxide and the hydroxide or both to be targeted, the mixing ratio thereof, the particle diameter, and so forth.

Dispersing Agent and so Forth:

In the present invention, various dispersing agents and surfactants may be used in accordance with the object and the necessity. Though not particularly restricted, various commercially available general surfactants and dispersing agents as well as a newly synthesized substance may be used. Illustrative example thereof includes an anionic surfactant, a cationic surfactant, a nonionic surfactant, as well as a dispersing agent such as various kinds of polymers. These may be used singly or as a combination of two or more of them.

The foregoing surfactants and dispersing agents may be contained in the fluid which contains at least one kind of a metal or a metal compound, or in the basic fluid, or in the both fluids. Alternatively, the surfactants and dispersing agents may be contained in a third fluid that is different from the basic fluid and the fluid which contains at least one kind of a metal or a metal compound.

Temperature:

In the present invention, temperature at the time of mixing of the basic fluid with the fluid which contains at least one kind of a metal or a metal compound is not particularly restricted. Temperature may be appropriately selected in accordance with the kind of a metal or a metal compound to be used, the object, the kind of any one of the oxide and the hydroxide or both to be targeted, the mixing ratio thereof, the particle diameter, the pH, and so forth.

The oxide may be obtained by baking the hydroxide or a mixture of the oxide and the hydroxide that are obtained by the present invention. The baking conditions such as temperature and time of the baking may be appropriately selected.

EXAMPLES

Hereunder, the present invention will be explained more specifically with referring to Examples. However, the present invention is not limited to the following Examples.

In Examples 1 to 6, a later-mentioned zinc compound solution (fluid which contains at least one kind of a metal or a metal compound) and an aqueous ammonia solution (basic fluid) were mixed in a thin film fluid formed between the processing surfaces 1 and 2 by using an apparatus based on the same principle as the apparatus shown in Patent document 3 as shown in FIG. 1, whereby separating zinc oxide, zinc hydroxide, or a mixture of them as microparticles. On this occasion, at least one condition selected from the group consisting of an introduction velocity of at least anyone of the zinc compound solution and the aqueous ammonia solution and pH of at least any one of the zinc compound solution and the aqueous ammonia solution was changed, so that the mixing ratio of zinc oxide to zinc hydroxide in the microparticles of the obtained zinc oxide, zinc hydroxide, or mixture of them was controlled.

Meanwhile, in the following Examples, the term "from the center" means "from the first introduction part d1" of the processing apparatus shown in FIG. 1; the first fluid means the first fluid to be processed which is introduced from the first introduction part d1; and the second fluid means the second fluid to be processed which is introduced from the second introduction part d2 of the processing apparatus shown in FIG. 1.

Measurement of pH:

Measurement of pH was done by using a pH meter Type D-51 (manufactured by Horiba, Ltd.). Before introduction of each fluid to be processed into the fluid processing apparatus, pH of each of the fluids to be processed was measured at room temperature.

Powder X-ray Diffraction Measurement (XRD):

The X-ray diffraction measurement was done by using a fully automated multi-purpose X-ray diffraction instrument X'Pert PRO MPD (manufactured by PANalytical B. V.). The diffraction strength was measured in the diffraction range of 10 to 100° as 2θ.

Observation with Transmission Electron Microscope (TEM):

Observation with a transmission electron microscope was done by using JEM-2100 (manufactured by JEOL Ltd.) with regard to the particle diameter of primary particles in plurality of viewing spots with the observation magnification of 20,000 or 200,000 to take the average value thereof.

Thermo Gravimetry Differential Thermal Analysis (TG-DTA):

The thermo gravimetry differential thermal analysis was done by using TG/DTA 6300 (manufactured by Seiko Instruments Inc.). Measurement was done with the temperature raising rate of 5° C./minute in the temperature range of 40 to 300° C.

Figure 4:
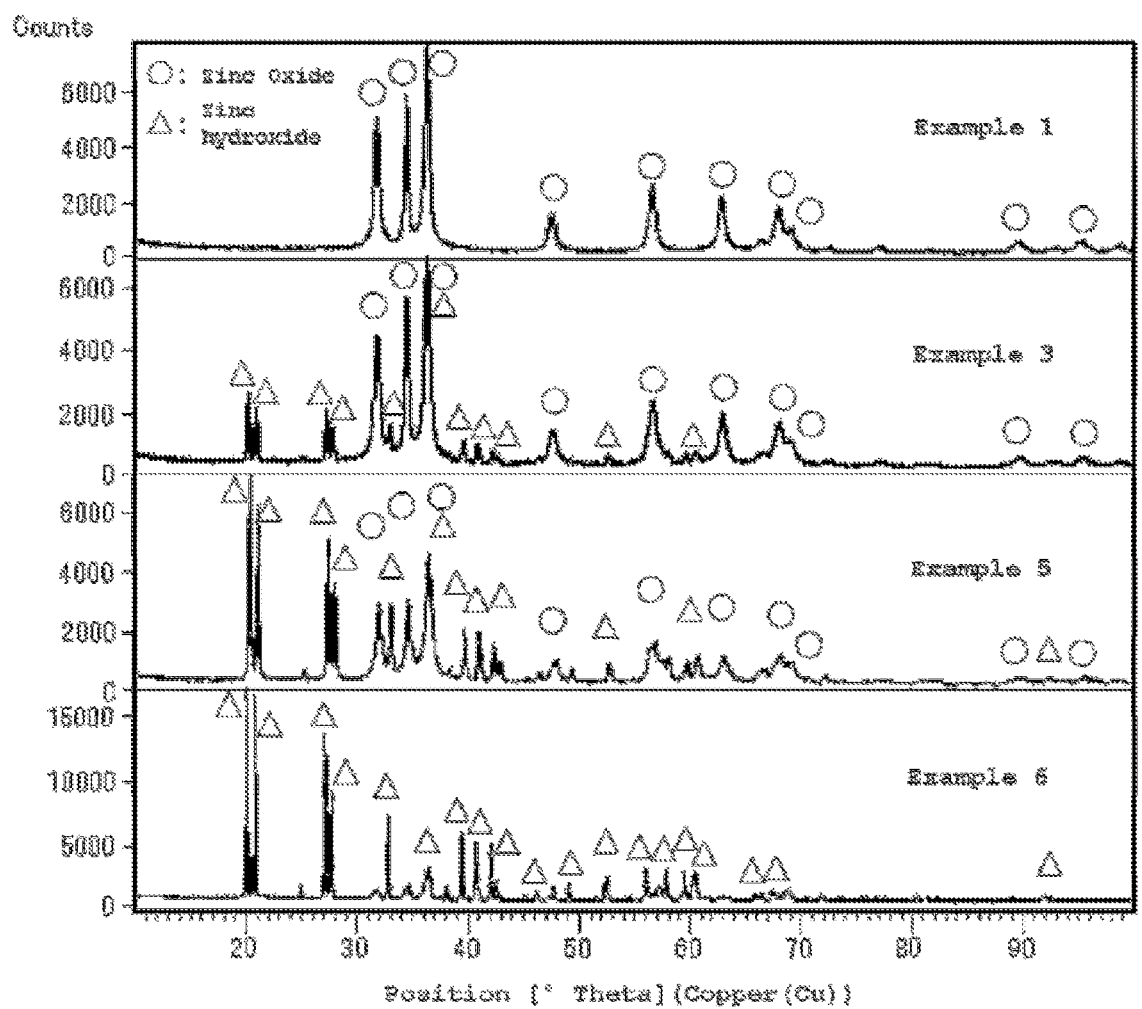
[FIG. 4]

An aqueous ammonia solution of the basic fluid as the first fluid was introduced from the center with supply pressure of 0.30 MPaG, rotation speed of 2000 rpm, and supply temperature of 100° C., while an aqueous zinc nitrate solution in which zinc nitrate (zinc compound) was dissolved in pure water was introduced as the second fluid of the zinc compound solution with supply temperature of 20° C. into between the processing surfaces 1 and 2, thereby mixing the first fluid and the second fluid in the thin film fluid. Each of supply temperatures of the first fluid and the second fluid was measured just before introduction of the first fluid and the second fluid into the processing apparatus (in more detail, just before introduction into between the processing surfaces 1 and 2). A dispersion solution containing microparticles of zinc oxide, zinc hydroxide, or a mixture of them was discharged from between the processing surfaces 1 and 2. The discharged microparticle dispersion solution of zinc oxide, zinc hydroxide, or a mixture of them was centrifugally separated to remove a supernatant solution; and then, the micoparticles were washed with pure water for three times and then dried at 60° C. under an atmospheric pressure. The dried powder was subjected to the XRD measurement and the TG-DTA analysis. Particle diameter of the primary particle thereof was confirmed by the TEM observation. In Table 1, the treatment conditions are shown together with the mixing ratio of zinc oxide to zinc hydroxide calculated from the TG-DTA analysis in terms of % by weight. Also shown therein is particle diameter of the primary particle confirmed by the TEM observation. In FIG. 4, XRD measurement results of microparticles of zinc oxide, zinc hydroxide, or a mixture of them obtained in Examples 1, 3, 5, and 6 are shown.

TABLE 1

| Example | First fluid Kind | pH | Introduction velocity (mL/minute) | Second fluid Kind | pH | Introduction velocity (mL/minute) | Zinc oxide:zinc hydroxide (% by weight) | Primary particle diameter (nm) |
|---|---|---|---|---|---|---|---|---|
| 1 | Aqueous ammonia solution (1% by weight) | 10.56 | 50 | Aqueous zinc nitrate hexahydrate solution (15% by weight) | 1.14 | 10 | 100:0 | 10 |
| 2 | | | 100 | | | 10 | 100:0 | 30 |
| 3 | | | 200 | | | 10 | 77.9:22.1 | 220 |
| 4 | Aqueous ammonia solution (2% by weight) | 11.04 | 50 | | | 10 | 98.6:1.4 | 500 |
| 5 | | | 200 | | | 10 | 37.0:63.0 | 20 |
| 6 | | | 200 | | | 5 | 0:100 | 8 |

From FIG. 4 and Table 1, it was confirmed that the mixing ratio of zinc oxide to zinc hydroxide in the obtained zinc oxide, zinc hydroxide, or mixture of them can be controlled by changing at least one condition selected from the group consisting of the introduction velocity of at least any one of the aqueous zinc compound solution and the basic fluid and pH of at least any one of the aqueous zinc compound solution and the basic fluid. Specifically, it was confirmed that microparticles of Examples 1 and 2 are formed of zinc oxide only, microparticles of Examples 3, 4, and 5 are formed of a mixture of zinc oxide and zinc hydroxide, and microparticles of Example 6 are formed of zinc hydroxide only.

From Table 1, it was confirmed that, by changing at least one condition selected from the group consisting of the introduction velocity of at least any one of the aqueous zinc compound solution and the basic fluid and pH of at least any one of the aqueous zinc compound solution and the basic fluid, not only the mixing ratio of zinc oxide to zinc hydroxide in the obtained zinc oxide, zinc hydroxide, or mixture of them can be controlled, but also particle diameter of the obtained zinc oxide, zinc hydroxide, or mixture of them can be changed. From the results shown above, it was confirmed that the mixing ratio of the oxide to the hydroxide in the obtained zinc oxide, zinc hydroxide, or mixture of them as well as the particle diameter of the obtained zinc oxide, zinc hydroxide, or mixture of them can be controlled simultaneously.

EXPLANATION OF REFERENCE NUMERALS 1 first processing surface
2 second processing surface
10 first processing member
11 first holder
20 second processing member
21 second holder
d1 first introduction part
d2 second introduction part
d20 opening

The invention claimed is:

1. A method for producing a mixture of an oxide and a hydroxide, comprising the steps of:
providing at least two fluids to be processed including a first fluid and a second fluid, wherein the first fluid contains at least one of a metal or a metal compound, and the second fluid is different from the first fluid and is a basic fluid which contains at least one basic substance;
mixing the first and second fluids in a thin film fluid formed between at least two processing surfaces which are disposed in a position facing each other so as to be able to approach to and separate from each other, at least one of the at least two processing surfaces rotating relative to the other;
producing the mixture of the oxide and the hydroxide by separating the mixture of the oxide and the hydroxide from the thin film fluid; and
controlling a ratio of the oxide to the hydroxide contained in the mixture of the oxide and the hydroxide to a predetermined ratio during the separation by changing a specific condition with regard to at least one of the first fluid or the second fluid being introduced into between the at least two processing surfaces,
wherein the specific condition is at least one condition selected from the group consisting of
an introduction velocity of at least one of the first fluid or the second fluid, and
pH of at least one of the first fluid or the second fluid.

2. The method for producing a mixture of an oxide and a hydroxide according to claim 1, wherein an element that constitutes the metal or the metal compound is at least one element selected from the group consisting of all metal elements in the periodic table, B, Si, Ge, As, Sb, C, N, S, Te, Se, F, Cl, Br, I, and At.

3. A method for producing a mixture of an oxide and a hydroxide, wherein the mixture of the oxide and the hydroxide produced by the method according to claim 1 are microparticles thereof.

4. A method for producing an oxide, wherein said oxide is produced by baking the mixture of the hydroxide and the oxide being produced by the method according to claim 1.

5. A method for producing a mixture of an oxide and a hydroxide, wherein the mixture of the oxide and the hydroxide produced by the method according to claim 2 are microparticles thereof.

6. A method for producing an oxide, wherein said oxide is produced by baking the mixture of the hydroxide and the oxide being produced by the method according to claim 2.

7. A method for producing an oxide, wherein said oxide is produced by baking the mixture of the hydroxide and the oxide being produced by the method according to claim 3.

* * * * *